Oct. 25, 1938.    J. L. CREVELING    2,133,975
ELECTRIC SYSTEM
Filed May 1, 1933    2 Sheets-Sheet 2
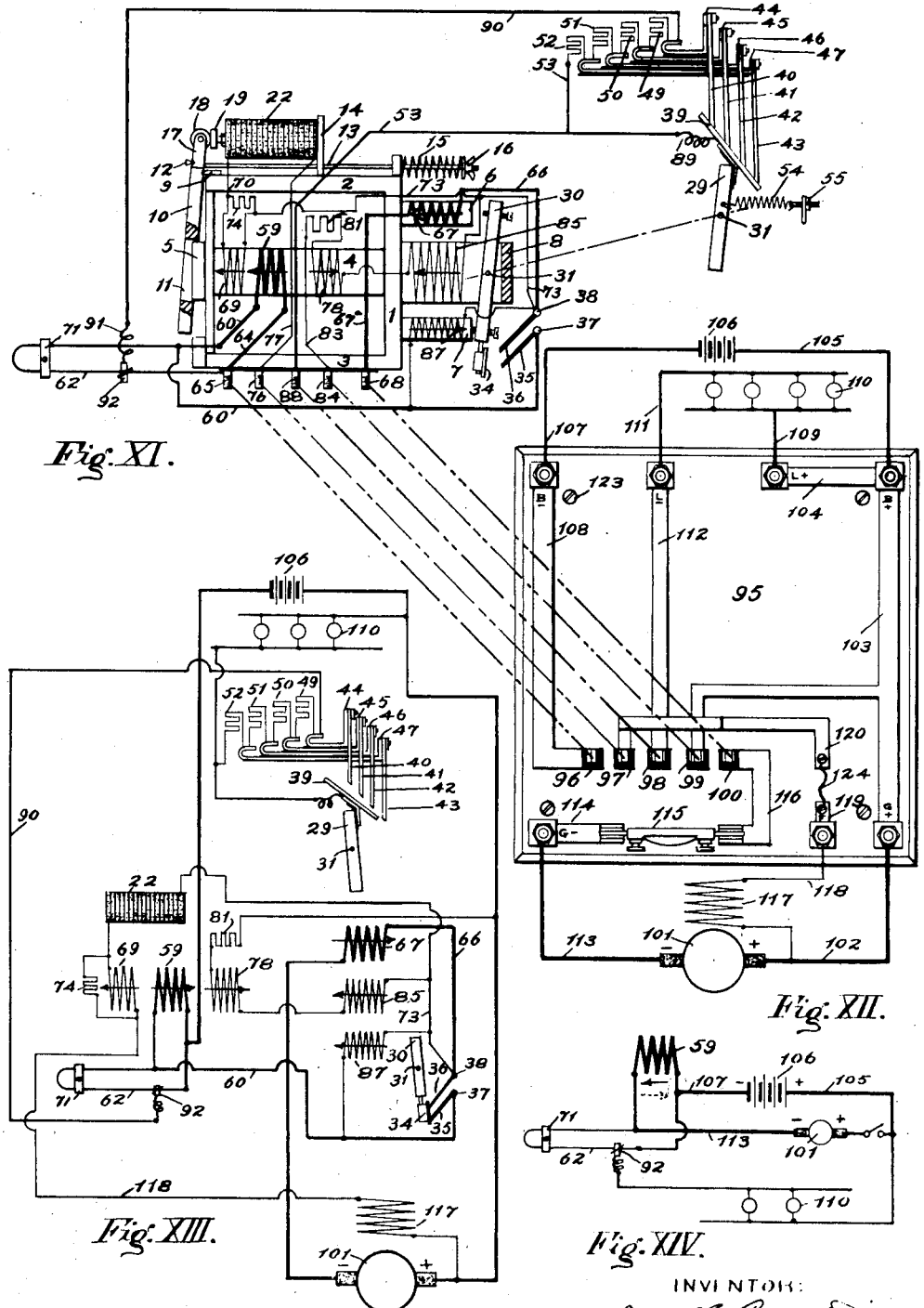
Fig. XI.
Fig. XII.
Fig. XIII.
Fig. XIV.
INVENTOR:
John L. Creveling Patented Oct. 25, 1938

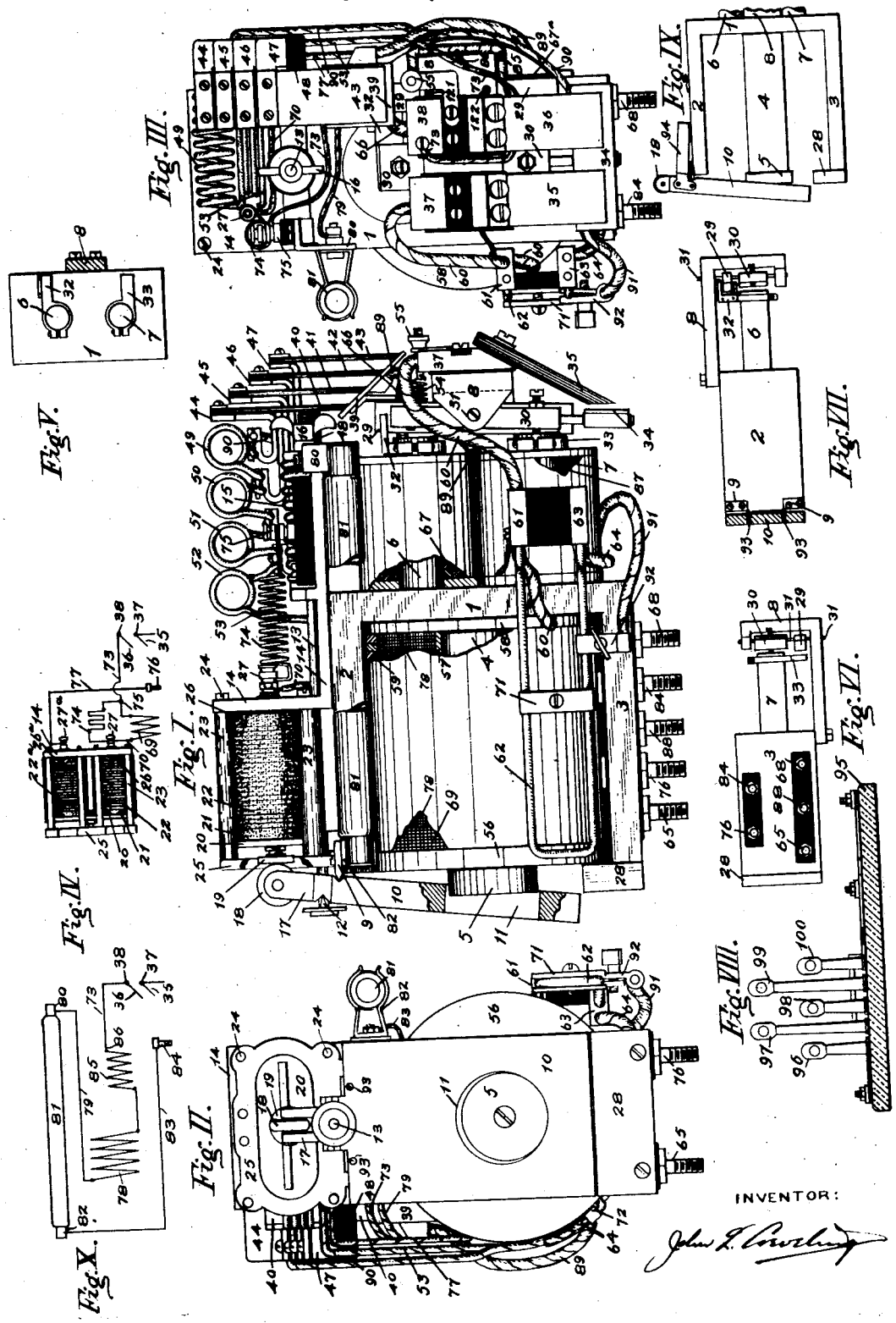

2,133,975

UNITED STATES PATENT OFFICE 2,133,975

ELECTRIC SYSTEM

John L. Creveling, near Tucson, Ariz., assignor to The Safety Car Heating & Lighting Company, a corporation of New Jersey Application May 1, 1933, Serial No. 668,800

20 Claims. (Cl. 171—314)

My invention pertains to that class of electric systems wherein an intermittent controllable source of electrical potential difference, at times tending to vary widely during its normal useful periods, is employed to operate lamps or other translating devices and charge a storage battery which supplies the translating devices when the potential difference at the source is below the value necessary to properly supply the same.

More particularly, my invention comprehends improved means whereby the source is automatically connected with the battery and translating devices and disconnected therefrom under predetermined desired conditions, whereby the source is automatically controlled in a desired manner regardless of tendency to vary, so as to properly charge the battery, and whereby the translating devices are automatically regulated in a desired manner.

As my invention is particularly applicable to that class of systems now in common use for the lighting of railway cars by means of a dynamo or generator driven from one of the axles of a car, it will be described with particular reference to such a system, without in any way limiting its use to this field.

When considered with respect to such an application, my invention has for one of its objects to provide a simple, rugged, compact and inexpensive regulating system which may be easily installed and maintained.

Another object is to provide such an installation which will require the minimum of attention and care as compared with systems employing a number of cranks and pivoted connections requiring lubrication and dashpots for insuring steadiness in operation.

Another object is to produce a regulating apparatus which can be readily removed and replaced by another properly calibrated and adjusted to perform its regulating operation in a predetermined manner.

Another object is to incorporate, in such a regulator, cooperating switch mechanism which will automatically connect the generator and battery when their voltages are substantially equal, regardless of the instant voltage of the battery throughout the limits of variation thereof met in practice, and disconnect the generator upon falling voltage, at substantially the instant battery voltage, so as to prevent any material back discharge from the battery through the generator.

Another object is to incorporate into such a structure a cooperating lamp or translating circuit regulator, magnetically operated by instrumentalities present in the device for performing other functions.

Another object is to provide a supporting means for the readily removable regulating and switching means which may be permanently connected with the wiring system of the car and which, when the regulating device is secured thereto, will properly connect the same in circuit to perform the above-mentioned functions.

Other objects will be mentioned in or become apparent from the following specification and drawings forming a part thereof, wherein:

Fig. I is a side elevation of a regulating and switching apparatus comprehended by my invention and which will hereafter be referred to as the regulator, for sake of brevity;

Fig. II is an end elevation of the structure of Fig. I, as viewed from the left;

Fig. III is an end elevation of the structure of Fig. I, as viewed from the right;

Fig. IV is a top plan of a portion of the structure of Fig. I, and a diagram of connections;

Fig. V is an end elevation of a portion of the structure of Fig. I, which portion will hereafter be referred to as the magnetic frame;

Fig. VI is a bottom plan of a portion of the structure of Fig. I, showing the magnetic frame, in particular, and some parts carried thereby;

Fig. VII is a top plan of a portion of the structure of Fig. I, corresponding to the bottom plan, Fig. VI;

Fig. VIII is a section of the backboard or base mounted upon a car and forming a part of the wiring system thereof, and a bottom plan of the brackets or fingers which form a shelf for supporting the regulator and connecting the same in circuit;

Fig. IX is a side elevation of part of the magnetic frame shown in Figs. X, XI and XII, to which there is added a modification which may be used, if desired;

Fig. X is a diagram showing how parts of the structure of Figs. I, II and III are connected in circuit;

Fig. XI is a diagrammatic representation of the regulator of Figs. I, II and III, showing the circuit connections of the same;

Fig. XII is a front elevation of the backboard and its bus bars and the shelf for carrying the regulator, diagrammatically connected in full lines with the car wiring system, battery, and generator, and in broken lines with the regulator;

Fig. XIII is a simplified wiring diagram of my invention and the entire wiring of a car; and Fig. XIV is a simplified diagram of a portion of the regulator and car wiring to illustrate the function of a portion thereof.

In the drawings, referring particularly to Figs. I, II, III, V, VI, VII and IX, there is shown a magnetic frame comprising a vertical member or yoke 1, provided upon one side with upper and lower horizontal members 2 and 3, and a centrally disposed core 4, having a pole piece 5. On the opposite side of the member 1, there are disposed a pair of horizontal cores 6 and 7 and an L-shaped horizontal member 8. The member 2 carries at its left-hand edge a pair of knife edges 9, engaging a V-groove in the armature or keeper 10, so as to form a substantially frictionless fulcrum therefor. The armature 10 is provided with an opening 11 registering with the pole piece 5, from which it is separated, in all positions of operation, by a short air-gap. Armature 10 is provided with another V-groove engaged by a pair of knife edges 12, arranged on each side of a rod 13; while 14 is a frame-like structure having a member serving as an abutment for one end of a compression spring 15, through which the rod 13 passes. Rod 13 passes through relatively large openings in the armature 10 and member 14, so as not to touch the same in any position of operation, and carries at its right-hand end a flanged bushing holding the rod centrally with respect to spring 15; while the wing nut 16, threaded upon the end of rod 13, serves to adjustably compress the spring 15 so as to tend to rotate the armature 10 in a clockwise direction about the supporting knife-edges 9. Armature 10 is provided with a bifurcated extension 17, supporting the sheave or roller 18, adapted to press against the disc-like head of screw 19, carried by the member 20, having united thereto, but insulated therefrom, a carbon plate or bridging member 21 (see Fig. IV), adapted to form a freely movable abutment for one end of the carbon piles 22 and 22a, carried by other insulating members 23, preferably composed of glass tubes supported by screws 24 (Figs. I, II, and III), engaging the upright portion of frame 14 and the frame-like structure 25, carried upon member 2, a portion of 25 being broken away in Fig. I to expose the arrangement of screw 19. The other ends of the piles 22 and 22a contact with the heavy carbon discs 26 and 26a (Fig. IV), insulated, as shown, from member 14, and held in place with respect thereto by screws passing through proper insulating bushings and terminating in the binding posts 27 and 27a, respectively.

Therefore, the carbon piles 22 and 22a are in series with respect to the posts 27 and 27a, and insulated from the rest of the structure, and are compressed by the action of spring 15, which, therefore, tends to decrease their resistance; while counterclockwise movement of armature 10 will lessen the pressure upon the piles so as to increase the resistance thereof. The member 3 is provided with a shoe of iron or other magnetic material 28, so arranged as to always be separated from the armature 10 by a short airgap.

The member 8 is provided with a pivot arrangement, indicated at 31, which carries the armatures or keepers 29 and 30, of iron or other suitable magnetic material, having a limited but free rocking movement about the same. The cores 6 and 7 serve as pole pieces for affecting the keeper 30, and are provided with lateral polar extensions 32 and 33 (Figs. I, V, VI, VII) which serve as pole pieces for the keeper 29. Keeper 30 carries a member 34, insulated therefrom and adapted upon clockwise movement of the keeper to cause contact with the flexible brushes 35 and 36 (Fig. III), so as to electrically connect the same. Brushes 35 and 36 are carried by conducting members 37 and 38, supported by the member 8 and insulated therefrom, as shown. Keeper 29 (Fig. I) is provided with a contact member 39 adapted, when 29 is moved clockwise, to first contact with flexible brush 43 and then, upon slightly greater movement, with brush 42, then brush 41, and then brush 40 (see Figs. XIII and XII).

The brushes 40, 41, 42 and 43 are carried by the conducting members 44, 45, 46 and 47, respectively, which are insulated from each other, as indicated, and attached to the insulating block 48 by screws passing through suitable insulating bushings (not shown), the block 48 being supported by a portion of the structure or frame 14.

The numeral 49 indicates a heavy resistance spiral (shown in Figs. I and III, in which latter figure other such spirals are omitted, for sake of clearness) having one end connected with the member 44, while its opposite end connects with the member 45 (see Fig. VIII), which is serially connected to a similar spiral 50, member 46, a similar spiral 51, member 47, and a similar spiral 52 with the wire 53. Wire 53 is carried to the screw post or stud 88 (Fig. I), forming one of a series of five similar connecting posts or studs carried by the member 3 from which they are all insulated, as shown in Fig. VI. The spring 54 (Fig. I) adjustable as by nut 55, tends to rock keeper 29 clockwise, so as to cause 39 to connect the brushes 40, 41, 42 and 43, as shown in Figs. I and XI. Upon core 4 there is mounted a spool or bobbin, comprising the head 56 which may be made of metal and closely fitted upon the core and between members 2 and 3, so as to serve as a means for maintaining the core and said members in fixed relation to each other. Head 56 carries a sleeve or tube 57, united with the head 58, comprising the remaining members of the spool. The spool is provided with a heavy winding 59, one end of which terminates in the wire 60, carried through the block of conducting material 61, and connected with the member 37. Wire 60 and block 61 are connected as by the resistance wire or shunt 62 with the conducting block 63, insulated from 61 as shown, and connected by wire 64 with the opposite end of coil 59, and as by connector 72 (Fig. II) with post 65. Therefore, post 65 is connected through the winding 59 with the member 37 and brush 35, while 62 forms a shunt across said coil 65 to divert a portion of current away therefrom, the amount depending upon the resistance of the shunt which may have a certain amount of adjustment which may be determined by the position of the heavy clamp or conducting bridge 71, as will hereinafter be more plainly brought out. Brush 36 (Fig. III) has its supporting member 38 connected as by wire 66 with one end of the heavy coil 67 surrounding the core 6, while the opposite end of said coil is connected with the post 68.

A moderately coarse winding 69 upon the bobbin, near the head 56, has one of its ends connected by wire 70 with the post 27, and is thus connected with one end of the carbon pile 22, as shown in diagram in Fig. IV. Post 27 also has connected therewith the spiral of resistance wire 74 (Figs. I, III and IV), which has its opposite end connected with the post 75, mounted upon the insulating block, as shown, and also connected by wire 73 with the member 38 carrying brush 36. The post 27a is connected by wire 77 (Fig. IV) with the post 76. Therefore, the post 76 is connected with the brush 36 through the carbon piles 22 and 22a and the winding 69, all in series; while 74 is a shunt across the winding, for the purpose of adjustment, as will later be explained.

The winding 78 is the main regulator energizing coil, of a large number of turns of relatively fine wire, and has one of its ends connected by wire 79 (Figs. III and X) with bracket 80, which is in connection with one end of the resistance unit 81, the opposite end of which is carried by the clip 82, connected by wire 83 with post 84. The opposite end of coil 78 is connected with one end of the winding 85 upon the member 8 (Figs. III and X); while winding 85 has its opposite end connected by wire 86 (Fig. III) with the wire 73, leading to member 38 and brush 36. Therefore, post 84 is connected with brush 36 through resistance 81, coil 78, and coil 85, all in series.

87 is a very fine winding upon the core 7 and is connected directly across the brushes 35 and 36, in effect, by being connected to wires 60 and 73, in electrical connection with said brushes. Post 88 is connected by the flexible lead 89 with the member 39, which is adapted to contact with brushes 40, 41, 42 and 43; and member 44 which carries brush 40 is connected by wire 90 with the flexible lead 91, which terminates in the clamp connector 92, adapted to be clamped in suitable position upon the resistance wire or shunt 62. The armature 10 is kept from lateral movement as by pointed screws 93 (Figs. II and VII) which engage the inner edges of the knife-edges 9. The member 94, shown in Fig. IX, is a magnetic shunt which may be applied to the armature 10, for a purpose which will later be pointed out.

The backboard or panel 95, shown in section in Fig. VIII, is provided with fingers or brackets 96, 97, 98, 99 and 100, which are insulated from each other and connected with appropriate bus bars, as indicated in Fig. XII. These form a shelf for the support of the structures of Figs. I, II and III, and the individual fingers 96, 97, 98, 99 and 100, connect the posts 65, 76, 88, 84 and 68, respectively, with their proper bus bars, so as to connect the regulating devices in circuit; and, when the proper nuts are placed upon the posts and tightened, the apparatus will be held rigidly in place. Then the regulating apparatus, which is portrayed in diagram in Fig. XI, will be operatively connected, as indicated by broken lines, with the other instrumentalities permanently located upon the car and indicated in Fig. XII.

In Fig. XII, 101 represents the dynamo or generator driven from the car axle and provided with means for delivering current in a uniform direction regardless of the direction of rotation of the armature, as is now well known in the art. The positive brush of the dynamo is connected by wire 102 with the post G+ of the bus bar 103, which is connected with the bracket 99 and provided with a post B+, which is connected with the positive side of the battery 106 by wire 105, the negative side of the battery being connected by wire 107 with the post B—, carried by the bus bar 108, which is connected with bracket 96. The bus bar 103 is also connected by member 104 with the post L+, which is connected by wire 109 with the positive sides of the lamps or translating devices, indicated at 110, which have their negative sides connected by wire 111, with the post L—, connected by bus bar 112 with the bracket 98. Bracket 100 is connected with bus bar 116, which is connected by the removable fuse link 115 with bus bar 114, provided with post G—, which is connected by wire 113 with the negative brush of the dynamo. The field winding of the dynamo is indicated at 117 as having one end connected on the positive side of the dynamo, while the opposite end is connected by wire 118 with the post F, provided with a short bus 119, connected by a fuse 124 with the bus bar 120, connected with the bracket 97.

In describing the operation of my invention, Figs. XI and XII will be referred to, in particular, as diagrammatically representing the system when the dynamo is still or operating at a voltage below that of the battery; and the simplified diagram of Fig. XIII will be referred to in describing the operation when the generator is supplying the battery and lamps; while the actual construction of the parts designated by the numerals mentioned may be seen by referring to Figs. I to IX, inclusive.

In applying my system to a car, as here assumed for example, the panel 95 is secured in place by screws 123, as indicated in Fig. XII; and the generator, battery, and lamp circuits are connected with the posts carried by the panel and marked, in an obvious manner, for their connection. The regulator is then placed upon the shelf formed by the brackets 96, 97, 98, 99 and 100, with the studs 65, 76, 88, 84 and 68 passing through the openings in the above-named brackets, respectively. Suitable nuts (not shown) are then drawn up upon the threaded portions of the studs, and the regulator thereupon becomes securely held in place and connected in the system, as indicated by the broken lines connecting Fig. XII with Fig. XI.

With the regulator thus mounted and the car stationary, current will flow from the battery 106, through wire 105, bus 103 and wire 102, to the generator 101, and thence through the same and wire 113, bus 114, fuse 115 and bus 116, to bracket 100, and thence through post 68, wire 67a, coil 67, wire 66 and coil 87; from which return is made through wire 60, coil 59 and shunt 62, to post 65, and thence through bracket 96, bus 108 and wire 107, to the battery.

As coil 87 has a large number of turns and relatively very high resistance, the current thus consumed is of such small value that it may be neglected as a load upon the battery and may, if desired, be even less than is usually allowed to flow back through the generator, and a mere ohmic resistance, for the sole purpose of assisting in building up the field upon starting. However, this very small current will cause the core 7 of coil 87 to very strongly hold the keeper 30 in the position indicated in Figs. I and XI, so as to hold the main switch contacts 34, 35, 36, open and prevent any accidental closing thereof. Under these conditions, pole piece 33 (Figs. I, V and VI) will also strongly attract the lower end of keeper 29 and cause the same to be firmly held in its extreme position of clockwise rotation, as determined by screw 122 (Fig. III). This will cause the brushes 40, 41, 42 and 43 to be flexed so as to form good contacts with the member 39 and thus short-circuit the resistances 49, 50, 51 and 52.

Assuming the coil 87 to be so wound that this current from the battery sets up a magnetic flux through core 7, in the direction indicated by the arrow in Fig. XI, this will mostly flow across the short airgaps to keepers 30 and 29, and thence across the air gaps to member 8. Most of the flux will return through members 8 and 1 to core 7, as indicated by the arrow upon coil 85; but some will also leak across the longer gaps from keepers 29 and 30 to the core 6, and flow through frame 1 to core 7, in the direction of the arrow upon coil 67. The effect of this upon the holding effort of coil 87 will be slight, and may even be assisted by the small current through 87 returning through the few turns of coil 67 without being of sufficient moment to be worth while connecting 87 to 67a instead of to 73 or 66, as may be done if desired.

If a lamp load be now thrown on, current will be supplied by the battery through wire 105, bus 104 and wire 109, to the translating devices 110; from which return will be made through wire 111, bus 112, bracket 98, post 88, wire 53, resistances 52, 51, 50 and 49, in multiple with flexible connector 89, member 39, and the brushes 40, 41, 42 and 43; thence through wire 90 to clamp connector 92; and thence through shunt resistance 62 and coil 59, in multiple with each other, to post 65; and thence through bracket 96, bus 108 and wire 107, to the battery 106. Owing to the short-circuiting action of member 39, this circuit will have a very low resistance and the lamps will be, in effect, directly across the battery and receive substantially battery voltage. Coil 59 is so connected that the portion of this current flowing from the battery to the lamps, through said coil, tends to set up a magnetic flux in the direction of the arrow upon the coil 35 in Fig. XI.

If, now, the generator have its armature revolved at reasonable speed, current will flow from the positive brush through field coil 117, wire 118, bus 119, fuse 124, bus 120, bracket 97, stud 76 and wire 77, to the carbon piles indicated at 22 (see also Fig. IV); from which return will be made through wire 70, coil 69 and resistance 74, in multiple therewith, wire 73, wire 66, coil 67, wire 67a, post 68, bracket 100, bus 116, fuse 115, bus 114 and wire 113, to the generator 101. This will cause the generator field to build up in a well-known manner, so as to produce the normal voltage at the so-called "critical speed"; and it is obvious that the generator may be controlled to compensate for speed changes taking place above this "critical speed" by proper manipulation of the pressure upon the carbon piles 22. It will be plain that such manipulation of the field current will also affect the magneto-motive-force of coil 69, as will hereinafter be more fully pointed out.

Further, it will be seen that the field current, by returning through switch coil 67, will tend to energize the same; and, as the back flow from the battery through coils 87 and 67 tended to set up a magnetic flux in core 6, in the direction of the arrow upon coil 67 in Fig. XI, the generator current through the field coil and coil 67 will tend to set up a flux in core 6 in the reverse direction, as indicated by the arrow upon coil 67 of Fig. XIII.

Further, it will be noted that, as the generator becomes active, current will flow from the same through wire 102, bus 103 and bracket 99, to post 84; and thence (see also Fig. X) through wire 83, resistance 81, coil 78 to coil 85; from which return is made through wire 73, wire 66, coil 67, wire 67a, post 68, bracket 100, bus 116, fuse 115, bus 114 and wire 113, to the generator. This current will therefore assist the field current in producing a flux through core 6, in the direction of the arrow upon coil 67 in Fig. XIII; while coils 85 and 78 are preferably so wound with respect to each other that the current therethrough tends to set up fluxes as denoted by the arrows upon the said coils in Figs. XI and XIII. Therefore, the main regulator exciting coil 78 will set up a flux through core 4 to member 1 which will flow through members 2 and 3 and across the short airgaps to armature 10, and thence across the short airgap between the opening 11 and pole-piece 5 to core 4. This flux will tend to attract armature 10 so as to rock the same about the knife-edges 9 in a counter-clockwise direction against the action of adjustable spring 15, in such manner as to reduce the pressure upon piles 22 and increase the resistance thereof, and thus cut down the generator voltage. This action will be opposed by the effect of a part of the field current in coil 69, and also by the action of part of the lamp circuit current through coil 59, as indicated in Fig. XI by the arrow on said coil, if the lamps are supplied by the battery and the connector 92 occupies the position upon the shunt 62 indicated in all figures where the same is shown in the drawings.

On this account, under the conditions considered, both coils 69 and 59 tend to oppose coil 78 as the generator voltage is being built up to the normal so as to assist in holding the resistance in the field circuit as small as passible, in order that the generator may reach its normal voltage at as low speed as possible, which, of course, is a very desirable feature.

It will be obvious that the coil 87, by being in effect across the break caused by the switch 34, 35, 36, will have a voltage across its terminals substantially equal to the difference between the battery voltage and that of the generator, and that the direction of current in the said coil will depend upon which of the above voltages is the greater.

Therefore, as the generator voltage builds up upon starting, until equal to that of the battery, the coil 87 will grow weaker while the current flowing through the coil 67 from the field circuit and also through coils 78 and 85 will grow stronger. And, therefore, by properly adjusting the airgaps between keeper 30 and cores 7 and 6, as can be done through the instrumentality of the lower adjustment screw 122 carried by keeper 30, I can cause the said keeper to revolve counter-clockwise and close the main switch 34, 35, 36 at the time the generator and battery voltages are substantially equal; it being plain that, if the generator voltage shall even very slightly exceed that of the battery, the current in coil 87 will reverse and tend to set up a flux in the direction of the arrow in Fig. XIII, and thus assist the switch in closing its circuit.

If, now, the generator voltage rises so as to supply current to line, the same will flow through coil 67 and increase the strength thereof so as to flex the brushes 35 and 36 and increase the contact pressure as the current to be carried increases, until the airgap between core 6 and keeper 30 is reduced to the limit determined by the upper adjustment screw 121 carried by 30. On the other hand, if the generator voltage now falls to near that of the battery, the current through coil 67 will fall and the elasticity of brushes 35 and 36 will lengthen the airgap between core 6 and keeper 30 and shorten the gap between 7 and 30, in a manner as may be determined by proper selection of the brushes 35 and 36 and proper adjustment of the positions thereof. These parts are usually so arranged that a very slight back discharge from the battery through the switch contacts and coil 67 will cause the switch to open, and then, if the generator voltage fall further, coil 87 will strongly hold the switch open, as first above pointed out.

While the upper and lower portions of keeper 30 and parts carried thereby including member 34 are substantially balanced with respect to pivot 31 and may be perfectly balanced if desired, I usually prefer to have the lower portion slightly heavier than the upper so that it will tend to take a substantially vertical position if the keeper be influenced by gravity alone.

While the above operations with respect to keeper 30 are taking place, keeper 29 tends to operate in a similar manner but has its action modified by the elasticity of the brushes 40, 41, 42 and 43, and also by the action of spring 54, to bring about the following results:

When the generator is still or running at quite low voltage, the keeper 29 is strongly held by attraction of the lower pole-piece 33 (Figs. I, V and VI) in the position indicated in Fig. XI, so that the resistances 49, 50, 51 and 52 are short-circuited, as previously pointed out; and, as the voltage across coil 87 lessens and the main switch closes and the generator begins to supply current to the battery or lamps, this current as it increases through coil 67 will cause the upper pole-piece 32 (Figs. I, III, V and VII) to attract the upper end of keeper 29 and, in step with the increase in such current to a predetermined value, break the contact between members 39 and 40, and thus insert resistance 49 in the lamp circuit, then contact 39—41 to add the resistance 50 in the lamp circuit, then contact 39—42 to add the resistance 51, and then the contact 39—43 to add the resistance 52. Whereupon, all the lamp current will pass through said resistances in series, as indicated in Fig. XIII.

For sake of simplicity, the regulator here shown is of the type used upon an ordinary passenger coach having a substantially constant lamp load which is all thrown on or off at once. Therefore, as the regulator limits the voltage of the generator throughout speed changes above that value necessary to produce the required instant voltage which may have its value adjusted by the current in coil 59, as will later be more fully explained, the only lamp regulation required will be to compensate for changes in generator voltage between the value limited by the regulator when the lamps are in circuit and the value which the battery can hold upon the lamps with the generator disconnected. And, if the lamp load is substantially constant, this compensation may be brought about by gradually inserting proper predetermined resistances in the lamp circuit as the generator current is raised from zero to the normal, or vice versa, as accomplished by the action of keeper 29, as now well-known in the art, since such current changes in coil 67 will usually take place upon similar changes in voltage.

If the lamp load is to vary materially, though within reasonable limits, the lamp circuit may be split up into branches having independent resistances therein, as shown in Patent 934,997, granted to me Sept. 28, 1909, wherein the said resistances are short-circuited by a carbon pile, in a manner that they may be short-circuited by my device here employed by giving the resistances 49, 50, 51 and 52, appropriate values.

Where extreme changes in lamp load take place, as upon a sleeping car, a separate lamp regulator, responsive to lamp voltage, is usually employed, but even these have their operation improved when short-circuited, gradually, during the slowing down and stopping of the car, and vice versa, as pointed out in Patent 1,025,455, granted to me May 7, 1912; and, thus, the lamp regulating means of the instant case may be used to perform the short-circuiting function brought out in said patent, as will be plain to those skilled in the art.

From the above it will be seen that resistance unit 81, coil 78 and coil 85, are in series with each other across the generator circuit, so that coil 78 will always be responsive to generator voltage, regardless of whether the main switch is open or closed during the normal operation of the system. The resistance unit 81 is of wire having substantially zero temperature coefficient, and is employed merely for preventing the heat developed in the coils from materially affecting their operation in response to voltage, in a manner now so well known in the art as to require no further explanation.

I so proportion the coil 78 and adjust the portion of the field current passing through coil 69, by means of the shunt 74, and so arrange and adjust the spring 15 and screw 19, with no load upon the lamp circuit and the main switch held open, as by hand, that when the maximum voltage which it is desired to ever impress upon the battery is reached, the attraction of the armature 10 will overcome spring 15 and, by decreasing the pressure upon piles 22, cut down the field current in such manner as to prevent this maximum voltage from being exceeded throughout any speed increase to be met in practice.

I find that the type of regulator here shown can be made to hold this voltage constant, within very narrow limits, throughout speed changes after the maximum desired value is reached; but it is obvious that as the generator voltage approaches this value there is a tendency, due partly to the elasticity of the piles operating against the spring 15, to release the pressure upon the piles and oppose the building up of full voltage at the lowest possible speed. There are here shown two distinct means for compensating for this tendency, to wit: the coil 69 in Figs. I, IV, XI and XIII, and the member 94 in Fig. IX, either of which may be used alone, or they may be used together, as may be desired.

Referring to the coil 69, it will be noted that the same at all times opposes the coil 78, and it is located at the end of core 4 nearest the airgaps, so that it affects the magnetic leakage from core 4 to the members 2 and 3; and, therefore, the leakage coefficient of the structure is greatest when the field current is greatest, and diminishes as the field current is cut down due to the action of the regulator after a desired voltage is reached. By properly designing the structure, advantage may be taken of this fact as well as other reactions brought about by coil 69, a full recital of which it is believed is unnecessary here, to cause the regulator to effect the field current very slightly until a desired voltage is reached and to hold the same substantially constant throughout speed changes after this value is reached.

When the device of Fig. IX is employed, the member 94 is so adjusted that, with the generator voltage low or at zero, the airgap between the right-hand end of 94 and the frame 2 is very small, so as to form a low reluctance magnetic shunt around the airgap between member 2 and armature 10. Therefore, there is a relatively very strong attraction between members 94 and 2, tending to rock 10 clockwise and increase the pressure upon the carbon piles 22 until armature 10 is rocked counter-clockwise by the action of coil 78, whereupon the said attraction falls off very rapidly. Therefore, it is believed to be plain that either or both of the above expedients may be utilized to compensate for the elasticity of the carbon piles and to prevent the regulator from materially affecting the operation of the generator until desired that it shall so act.

Further, as previously pointed out, if the generator be stationary or operating at sufficiently low speed and the lamps are on, part of the current supplied thereto by the battery will flow through coil 59, in the direction tending to oppose the effect of coil 78, as indicated in Fig. XI, and prevent the said coil from affecting the carbon piles 22 until this load is taken off the battery by the generator. And, therefore, this also assists in preventing the regulator from affecting the generator until it reaches a voltage equal to that of the battery; whereupon a portion of the charging current, as well as a part of the current from the generator to the lamps, may be caused to affect the regulator in an adjustable degree, as may be determined by the positions of shunting clamp 71 and connector 92 (Figs. I, XI, XIII and XIV). This may most readily be seen by referring to the simplified diagram in Fig. XIV, wherein the main switch is indicated as open and the lamps are shown as operating. Under these conditions, current will flow from the positive side of the battery 106, through wire 105 and lamps 110, to the connector 92, where it will divide and part will return through the right-hand portion of the lower branch of shunt member 62 and wire 107 to the battery, while part will return through the remaining portion of shunt 62, clamp 71, coil 59 and wire 107, to the battery; and it is assumed this current tends to set up a flux in coil 59, in the direction of the full line arrow in the figure corresponding to the arrow upon the coil in Fig. XI.

Assuming, now, that the generator speed be brought up to the point that its voltage is substantially that of the battery, the main switch will close and the generator may supply some of the lamp current. This will lessen the battery current in coil 59, and the generator current will return to the generator through wire 113. If, now, the generator voltage be brought up until it not only supplies all of the lamp current but also charges the battery, this charging current will flow from the generator 101, through the switch and wire 105, battery 106 and wire 107, and thence part through coil 59, in the opposite direction to that supplied by the battery; wherefore, it will now tend to assist the coil 78 in operating the regulator, as indicated by the arrow in Fig. XIII and the dotted arrow in Fig. XIV; while part will return through shunt 62, without affecting coil 59.

The amount of current that will be shunted away from coil 59 by the wire 62 may be adjusted, within certain limits, by the position of the clamp 71 and the position of connector 92, it being noted that the coil 59 may be nearly short-circuited by properly placing clamp 71, and that connector 92 can be connected close to either end of coil 59, as may be desired; while it is to be remembered that coil 59, being of relatively few turns of heavy copper wire, has a very low resistance and will, in any event, receive a portion of the current; and that, by making the shunt 62 of wire having a higher temperature co-efficient than the copper wire of coil 59, I can cause a greater portion of the generator output to pass through the coil 59 as the output increases.

In practice, with the regulator so arranged and adjusted that it will hold the generator voltage on open circuit substantially constant throughout speed changes, at the maximum value ever to be desired, I find it usually preferable to select this maximum as that value which will balance the battery voltage or just force a very small current through the battery when it is in a substantially fully charged state, as this will prevent overcharging if the generator is operated at long intervals with only the battery as a load and prevent an excessive generator voltage in case of a broken battery lead, in a manner now well known in the art. I then usually so adjust clamp 71, with the battery on and no lamp load, that even if the battery voltage be very low, due to its being in a discharged state, too great a current will be held from flowing through it, as this will be prevented by the portion thereof flowing through coil 59 and assisting coil 78. I usually then so adjust the connection of the lamp circuit by means of connector 92 that, when the lamps are on, a sufficient portion of the lamp current will flow through coil 59 that, with the battery in normal condition and receiving a fair charging current, the voltage standard of the regulator will be somewhat lower than when on open circuit and so bring about a cycle of operation which may, perhaps, best be seen by taking a typical example of satisfactory values.

Assuming the system to be one for operation with a battery of sixteen lead-acid cells having a normal discharge voltage of substantially 32 volts and a substantially uniform lamp load of about 30 amperes when on, if the regulator be so adjusted that the maximum voltage of the generator on open circuit will be held from exceeding, say, 40 or 42 volts, the battery will not at any time be overcharged, as its back voltage will tend to reach this value as it becomes fully charged. However, throughout most of the normal charging period of the battery while a full charging rate is desired, considerably less voltage is required to send the desired current through the battery; and, by properly proportioning coil 59 and shunt 62 and adjusting clamp 71, I cause enough of the charging current to flow through coil 59 to limit the charging current to about 40 or 50 amperes during the normal conditions and to, say, 75 amperes or so when the battery is in a quite discharged state, from which it will rapidly recover, if otherwise in good condition, and proceed to take about 40 or 50 amperes, as above mentioned, until nearing its fully charged state, when the battery voltage will rise and approach 40 or 42 volts and the charging current will fall off and approach zero.

If the lamps be now thrown on, the battery will supply some of the current and its voltage will soon drop to about its normal charging value and the lamp load will all be carried by the generator, and the lamps will be supplied through the resistances 49, 50, 51 and 52 in series. As soon as the generator stops, the lamps all fall upon the battery and its voltage will be substantially 32 volts and the lamp resistances will all be withdrawn. Upon starting again, about 34 or 35 volts will supply the desired charging current under these conditions, which may be about equal to the lamp load or even less, and this will put back what was taken at the last stop but will taper off as the voltage rises toward 34 or 35 volts. Therefore, the lamp resistance only has to take care of 2 or 3 volts variation, under ordinary conditions. However, as soon as the lamps are turned off, as in daylight running, the regulator will proceed to allow the battery to become charged up to its highest desired voltage of, say, 40 or 42 volts.

This periodical charging to 40 to 42 volts keeps a battery in the best condition but it is needless to keep its voltage at this point during the time the lamps are ordinarily used, and my system, therefore, effects a desired economy by maintaining a lower voltage during lamp use and ordinarily requires only the drop of 2 or 3 volts to be carried by the lamp resistance, instead of 8 or 10 volts as in most systems now in common use.

As the connector 92 can readily be clamped upon the shunt 62 at any desired point, the effect of the lamp load upon the regulator can readily be adjusted, and the maximum effect will take place when the connector 92 is clamped upon the lower branch of shunt 62 and nearest to the point of connection of coil 59; while the minimum effect will occur when the connector 92 is upon the upper branch of shunt 62 and nearest to the point of connection of coil 59.

While I have shown a regulator comprising a regulating element operated by an electro-magnetic device which requires no dashpots or other mechanical retarding means to prevent "hunting", the general type of such regulator is not here broadly claimed as the same is covered in my copending application 351,377, for improvement in Electric regulators, filed March 30, 1929, issued June 20, 1933, as Patent Number 1,914,909, from which the present structure differs principally in having a different form of pole-piece, as indicated at 5, and a different type of pole-shoe, as shown at 28, the combined effect of which is similar to that of the corresponding parts in said copending application, though the useful magnetic pull between the present pole-piece 5 and armature 10 is more uniform, and that between armature 10 and pole-shoe 28 automatically varied to bring about constant regulation in what may be considered a converse manner to that employed in said copending application.

From the foregoing it will be seen that I have produced a simple, rugged and compact, unit for connecting and disconnecting a source of variable potential difference and a storage battery at such times as there is substantially no difference of potential therebetween, which unit is also capable of regulating the source to prevent undesirable fluctuations throughout wide tendencies thereof to vary, and that the said unit is capable of otherwise regulating the source to meet certain conditions of load, charge of battery, etc., in a desired manner, and also of controlling the voltage upon the load circuit.

It will also be plain that the said unit may be readily connected in place to perform its functions, and removed and replaced by a proper, like, substitute which may be properly calibrated in advance to perform in a desired manner, and that various other desirable features and adjustments, etc., are present in the structure of my invention, which are wanting in the systems now common in the art.

It will also be noted that the coils 69 and 59 not only perform the regulating functions above pointed out but, since they are provided with shunts, assist in preventing "hunting" of the regulator upon fluctuations in voltage across the coil 78, as they act as closed secondary coils surrounding the core 4. Further, the presence of the coils 65 and 59 in their present environment causes the regulator here shown to differ in these particulars from the regulator shown in my application 351,377, above mentioned.

In so far as common subject-matter is concerned, this application is a continuation of my copending applications 351,377, for improvement in Electric regulator, filed Mar. 30, 1929, issued June 20, 1933, as Patent Number 1,914,909; 378,663, for improvement in Electric regulation, filed July 16, 1929, issued January 15, 1935, as Patent Number 1,987,992; and 403,176, for improvement in Car lighting systems, filed Oct. 29, 1929, issued June 27, 1933, as Patent Number 1,915,295.

I do not wish in any way to limit my invention to the exact structures or methods of operation above set forth merely to illustrate an embodiment thereof, as it is plain that wide departure may be made without departing from the spirit and scope of my invention which is as set forth in the following claims:

I claim:

1. An electric system including a source of voltage tending to vary, a storage battery, translating devices, and an automatic electro-magnetic device connecting the source with the battery including an operating magnetic circuit and a magnetic circuit in shunt thereto and means affected by said shunt circuit for progressively affecting the operation of translating devices as current from the source increases and decreases.

2. In an electric system, a source of voltage tending to vary, a storage battery and translating devices supplied thereby, an automatic device for controlling the connection of the source, comprising a movable magnetic member motion of which in one direction connects the source in circuit and in the opposite direction breaks such connection, said movable member when free from magnetic influence adapted automatically to take a relatively central position with respect to its extreme movements of operation, and magnetic means moving the said member in one direction when the voltage of the source falls below that of the battery and in an opposite direction when the voltage of the source rises above that of the battery.

3. In an electric system, a source of voltage tending to vary, a storage battery and translating devices supplied thereby, an automatic device for controlling the connection of the source, comprising a movable magnetic member motion of which in one direction connects the source in circuit and in the opposite direction breaks such connection, said movable member when free from magnetic influence tending to take a neutral position relative to its extreme movements of operation, and magnetic means moving the said member in one direction when the voltage of the source falls below that of the battery and in an opposite direction when the voltage of the source rises above that of the battery combined with a second movable member influenced by said mag- 4. An electric system including a generator, a storage battery and translating devices supplied thereby, an automatic voltage operated regulator for controlling the voltage of the generator, and means for adjusting the operating standard of said regulator in response to current output comprising a series coil and a shunt around the same affected differently by changes in current to the battery and to the translating devices.

5. An electric system including a generator, a storage battery and translating devices supplied thereby, an automatic regulator for controlling the voltage of the generator, and means for adjusting the operating standard of said regulator in response to current output comprising a series coil and a shunt around the same, said translating devices being connected with said shunt by a movable tap.

6. An electric system including a generator, a storage battery and translating devices supplied thereby, an automatic regulator for controlling the voltage of the generator, and means for adjusting the operating standard of said regulator in response to current output comprising a series coil and a shunt around the same, said translating devices being connected as a branch with said shunt so that the current to said devices affects the adjustment of the voltage held upon the generator by the voltage regulator.

7. In an electric system, a regulator unit for controlling the operation thereof and quick detachable means for supporting said unit and connecting the same in circuit comprising a plurality of electrically separate members cooperating to form a horizontal shelf-like support.

8. In an electric system, a regulator unit for controlling the operation thereof and quick detachable means for supporting said unit and connecting the same in circuit comprising a plurality of electrically separate members cooperating to form a horizontal shelf-like support for said unit and connectors for making its circuit connections.

9. In an electric system including a source of voltage tending to vary, a storage battery and translating devices supplied thereby, a magnetizable unit having cooperating instrumentalities operated upon variations in said voltage to connect and disconnect the source, to regulate the source and to regulate the translating devices.

10. In an electric system, a generator driven at variable speed, a storage battery and translating devices supplied thereby, means for connecting and disconnecting the generator and battery when their voltages are substantially equal throughout changes in battery voltage, means for affecting the voltage impressed upon the translating devices, and means for regulating the generator to compensate for speed changes, all said means being combined in a unitary magnetic structure with cooperating electro-responsive means.

11. In an electric system, a generator driven at variable speed, a storage battery and translating devices supplied thereby, means for connecting and disconnecting the generator and battery when their voltages are substantially equal throughout changes in battery voltage, means for affecting the voltage impressed upon the translating devices and means for regulating the generator to compensate for speed changes, all said means being combined in a unitary structure with cooperating electro-responsive operating means and quick detachable means for supporting and connecting said unit in circuit.

12. In an electric system, a generator and an automatic regulator therefor comprising a regulating element, a rockable member for affecting said element, means tending to move said member to increase the activity of the generator and electro-magnetic means affected by the activity of the generator tending to move said member to reduce said activity, including three substantially parallel magnetic members attracting said rockable member across short airgaps and having the attractive effort of the middle member more uniform than the outside members.

13. In an electric system, a generator and an automatic regulator therefor comprising a regulating element, a rockable member for affecting said element, means tending to move said member to increase the activity of the generator and electro-magnetic means affected by the activity of the generator tending to move said element to reduce said activity, including three substantially parallel magnetic members attracting said rockable member across short airgaps and having the attractive effort of the middle member more uniform than the outside members, and responsive means adjusting the operating standard of said electro-magnetic means.

14. In an electric system including a source of voltage tending to vary, a regulator for automatically controlling the voltage, comprehending a voltage responsive coil receiving current fro the source and capable of operating the regulator unaided, said coil having a substantially closed magnetic circuit of high permeability material necessary for the operation thereof, and an adjusting coil magnetically cooperating therewith, provided with a temperature responsive shunt and serving as a damping means upon variations in voltage upon the voltage responsive coil.

15. In an electric system, in combination, a generator which supplies a current of variable magnitude and voltage, and a regulator means to control the field current of said generator including, an armature, a variable resistance connected in the circuit of the field current the value of which is determined by the relative position of said armature, and means to control the position of said armature including, a coil to set up a flux which at all times varies directly with the generator voltage, and means to minimize the effect of said magnetic flux, said last named means being effective when said regulator is ineffective to exert control upon the field current and substantially ineffective when said regulator is effective to exert control upon the field current.

16. Apparatus as recited in claim 15 in which the means to minimize the effect of the magnetic flux is a coil connected in series with the generator field.

17. Apparatus as recited in claim 15 in which the means to minimize the effect of the magnetic flux is a current coil connected in series between the generator and the battery.

18. Apparatus as recited in claim 15 in which the means to minimize the effect of the magnetic flux is an arm of relatively high permeability to divert magnetic flux from its normal path.

19. In an electric system, in combination, a battery, translating means, a generator which supplies a current of variable magnitude and voltage to said translating means and said battery, and a regulator means to control the field current of said generator including, means to set up a flux in said regulator proportional to the generator voltage, a current coil connected in series with said generator and battery, and a shunt connected in parallel with said current coil, one side of said translating means being connected to one terminal of said battery and said generator and the other side being connected to said shunt by means of a movable tap, said movable tap being connected to said shunt at a point such that a portion of said shunt is in series in the circuit of said battery and said translating means and a portion of said shunt is in series with the circuit of said generator and said translating means.

20. Apparatus as recited in claim 19 in which the shunt has a temperature resistance coefficient higher than the corresponding characteristic of the generator output circuit.

JOHN L. CREVELING.

CERTIFICATE OF CORRECTION.

Patent No. 2,133,975.  October 25, 1938.

JOHN L. CREVELING.

It is hereby certified that error appears in the printed specification of the above numbered patent requiring correction as follows: Page 4, second column, line 31, for "passible" read possible; page 8, first column, line 64, claim 10, before the word "means" insert operating; and that the said Letters Patent should be read with this correction therein that the same may conform to the record of the case in the Patent Office.

Signed and sealed this 24th day of January, A. D. 1939.

Henry Van Arsdale (Seal)

Acting Commissioner of Patents.